United States Patent
Mohamed (12)

(10) Patent No.: US 6,230,180 B1
(45) Date of Patent: May 8, 2001

(54) DIGITAL SIGNAL PROCESSOR CONFIGURATION INCLUDING MULTIPLYING UNITS COUPLED TO PLURAL ACCUMLATORS FOR ENHANCED PARALLEL MAC PROCESSING

(75) Inventor: Moataz A. Mohamed, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/172,527

(22) Filed: Oct. 14, 1998

(51) Int. Cl.$^7$ .................................................. G06F 9/302
(52) U.S. Cl. ........................ 708/523; 708/524; 712/22; 712/221
(58) Field of Search ................... 708/603, 523, 708/524; 712/22, 221

(56) References Cited

U.S. PATENT DOCUMENTS

| | | | |
|---|---|---|---|
| 4,490,807 | * 12/1984 | Chevillat et al. | 708/524 |
| 4,754,421 | * 6/1988 | Bosshart | 708/625 |
| 5,175,702 | * 12/1992 | Beraud et al. | 708/523 |
| 5,434,808 | * 7/1995 | Cohen | 708/402 |
| 5,596,518 | * 1/1997 | Toyokura et al. | 708/402 |

FOREIGN PATENT DOCUMENTS

| | | |
|---|---|---|
| 0 476 558 A2 | 3/1992 | (EP) . |
| 0 767 425 A2 | 4/1997 | (EP) . |
| 0 817 006 A2 | 1/1998 | (EP) . |
| 0 901 068 A2 | 3/1999 | (EP) . |

* cited by examiner

Primary Examiner—Kenneth S. Kim
(74) Attorney, Agent, or Firm—Snell & Wilmer L.L.P.

(57) ABSTRACT

The present invention generally relates to multiply-accumulate units for use in digital signal processors. Each multiply-accumulate unit includes a multiply unit which is coupled with two or more dedicated accumulators. Because of the coupling configuration, when an instruction specifies which accumulator should be used in executing an operation, the instruction need not specify which multiply unit should be utilized. A scheduler containing a digital signal processor's coupling configuration may then identify the multiply unit associated with the accumulator and may then forward the instruction to the identified multiply unit. Multiply-accumulate units can be configured to execute both scalar and vector operations. For executing vector operations, multiply units and their coupled accumulators are configured such that each may be easily grouped with other multiply units and accumulators.

10 Claims, 2 Drawing Sheets

DIGITAL SIGNAL PROCESSOR CONFIGURATION INCLUDING MULTIPLYING UNITS COUPLED TO PLURAL ACCUMLATORS FOR ENHANCED PARALLEL MAC PROCESSING

RELATED APPLICATIONS

Not applicable.

TECHNICAL FIELD OF THE INVENTION

The present invention relates generally to digital signal processors. In particular, the present invention relates to the association or coupling between accumulators and multiplying units in a programming model for a high performance digital signal processor.

BACKGROUND OF THE INVENTION

A variety of types of operations are needed for a digital signal processor ("DSP") to accomplish desired tasks. These operations are performed on data elements, operands, and the like and typically include mathematical operations, logic operations, shifting operations, and other data manipulation operations. For example, these operations might include adding, subtracting, multiplying, dividing, selecting, combining, arithmetic shifting, logic shifting, and the like. These operations may be identified in program instructions and may be executed by functional units, execution units, processing elements, or the like.

One such functional unit that is often utilized by DSPs is a multiply-accumulate ("MAC") unit. MAC units multiply two or more operands together and add the product to a value already stored in an accumulator. This value may be a fraction or integer, real or complex, and may be positive, negative or zero. The accumulator is a register that is at least wide enough to hold the largest product produced by the multiplier. It can be used as a source or a destination register for operations.

In trying to achieve faster processing while minimizing the physical size of the processor and the power requirements, a problem exists in whether to have accumulator registers dedicated to each of the MAC units or whether to have several accumulator registers available for random use by all of a processor's MAC units. In addition, it is important that the configuration between accumulator registers and MAC units facilitate different types of operations, such as scalar and vector operations, which are typically required by different types of DSP programming models.

More specifically, there are several types of programming models for digital signal processors which use MAC units. A first type of programming model is an instruction parallelism model which is defined by its ability to simultaneously execute different instructions. This model uses a horizontal approach to parallelism where several instructions are included in a long instruction word that is fetched and executed every cycle. This model may be embodied in a very long instruction word ("VLIW") model or a super-scalar model, among others. Instruction parallelism models are very effective in telecommunication applications.

Data parallelism models are a second type of model and may be able to simultaneously execute multiple operations of a single instruction, where each operation can be performed with different data. Data parallelism models utilize vector operations and are embodied in a single instruction multiple data ("SIMD") model. Data parallelism models are very efficient in block based applications such as image processing, filtering applications and multimedia applications.

In super-scalar and SIMD processors, typically the accumulator registers are either dedicated to specific MAC units or else a very small number of accumulator registers are available for all MAC units. These configurations may increase the processing time, consume too much physical chip space, or increase power consumption.

A more efficient configuration between MAC units and accumulator registers is needed, especially for processors that include both horizontal parallelism and vertical parallelism.

SUMMARY OF THE INVENTION

Accordingly, it would be extremely advantageous to develop a configuration between MAC units and accumulator registers which permits the execution of both horizontal operations and vertical operations and balances the need for faster processing with the need to minimize the physical size of the processor and minimize power consumption.

The above and other advantages are carried out in one form by a digital signal processor which includes a multiply element that multiplies at least two data elements or operands together, resulting in a product. In addition, two or more accumulating elements are operatively associated with or coupled to each multiplying element. Each accumulating element contains a stored value which is replaced by the sum of the stored value and the product from the multiply element.

BRIEF DESCRIPTION OF THE DRAWING

A more complete understanding of the present invention may be derived by referring to the detailed description and claims when considered in connection with the Figures, wherein like reference numbers refer to like items throughout the Figures, and:

DETAILED DESCRIPTION OF THE PREFERRED EMBODIMENTS

The present invention relates to the coupling and configuration of multiply-accumulate ("MAC") units for use within digital signal processors ("DSPs"). In general, a number of accumulators are dedicated to each MAC unit in a manner that enables both scalar and vector operations.

The present invention may be described herein in terms of functional block components and various processing steps. It should be appreciated that such functional blocks may be realized by any number of components configured to perform specified functions. For example, the present invention may employ various integrated circuit components, which may carry out a variety of functions. In addition, those skilled in the art will appreciate that the present invention may be practiced in any number of data processing contexts and that the digital signal processing configuration described herein is merely one exemplary application for the invention. Further, it should be noted that the present invention may employ any number of conventional techniques for data storage, transport, manipulation, processing, and the like. Such general techniques that may be known to those skilled in the art are not described in detail herein.

The following U.S. Patent Applications are related to the present invention. More specifically, these U.S. Patent Applications detail, inter alia, exemplary instruction set architectures for permitting a plurality of types of instructions to be executed by processing elements and exemplary arrangements of other processing elements such as functional units and register files for achieving efficient execution of instructions while balancing time, cost and spacial concerns. Therefore, the following U.S. Patent Applications are hereby incorporated by reference: Reconfigurable Functional Units for Implementing A Hybrid VLIW-SIMD Programming Model, by inventor Moataz A Mohamed, Ser. No. 09/172,315, filed Oct. 14, ,1998 and Efficient Forwarding Paths and Operand Sharing in a Digital Signal Processor, by inventors Moataz A. Mohamed, John R. Spence and Kenneth W. Malich, Ser. No. 09/173,257, filed Oct. 14, 1998.

Figure 1:
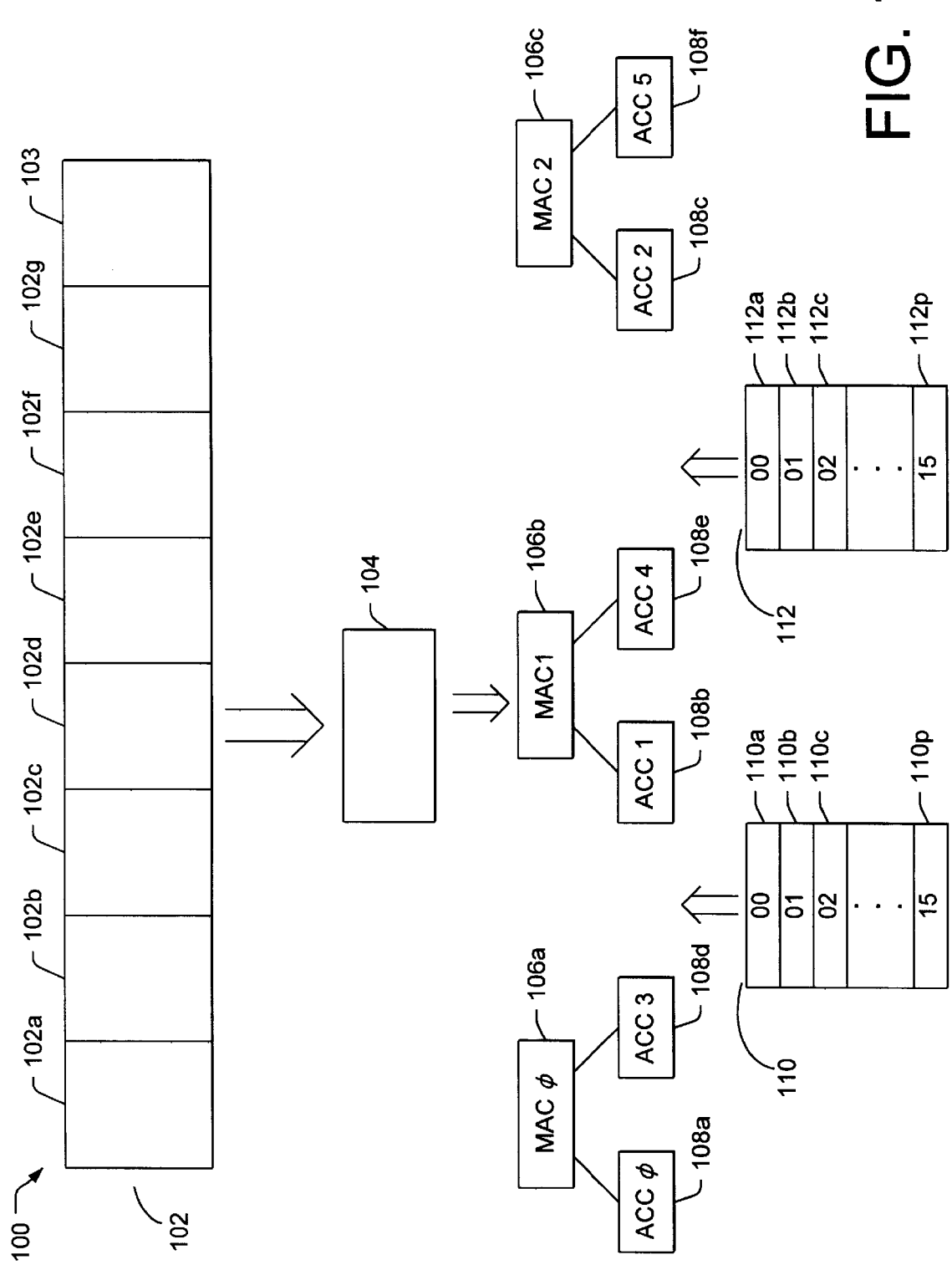
FIG. 1 shows a block diagram of an exemplary configuration of a digital signal processor.

Referring to FIG. 1, an exemplary DSP 100 includes an instruction packet 102, a scheduler 104, a plurality of MAC units 106, a plurality of accumulators 108, and data registers 110 and 112. Instruction packet 102 typically comprises a number of individual instructions 102a–102g and a header or template field 103. Instruction packet 102 is preferably 256 bits wide, although other bit widths may be used. Instructions 102a–102g and header 103 are typically 16 or 32 bits wide, although other bit widths maybe used. Each individual instruction 102a–102g typically identifies an operation to be performed on certain data elements or operands. The data elements may be stored in data registers 110 and 112 which may be scalar or vector.

As identified above, these operations might include mathematical operations, logic operations, shifting operations, and other data manipulation operations. For example, these operations might include adding, subtracting, multiplying, dividing, selecting, combining, arithmetic shifting, logic shifting, and the like. The operation might also be a MAC operation which is common in DSP systems.

A MAC operation is one in which two or more operands are multiplied and the product is added to a value in an accumulator. An accumulator is a register having a stored value which may be increased by adding a new value to the stored value resulting in a sum which is then stored in the accumulator. MAC units are preferably 32 bits×32 bits so that they can execute one 32×32 bit operation, one 32×16 bit operation, or two 16×16 bit operations, although other dimensions may also be suitable. Accumulators are preferably 10×40 or 10×48 bit registers, but other register widths may also be suitable.

An exemplary instruction 102a might be the following MAC instruction:

MAC ACC1 SR1 SR2

Instruction 102a is requesting that the values stored in scalar register one 110b and scalar register two 110c be multiplied by MAC unit one 106b and the product be added to a value stored in accumulator one 108b. This sum will replace the value previously stored in accumulator one 108b.

More particularly, DSP 100, in accordance with a preferred embodiment of the present invention, may execute instruction 102a as follows. Instructions 102a–102g of instruction packet 102 are sent to a scheduler 104. Scheduler 104 typically contains information on the data path structure, i.e., a mapping of how the registers and functional units are associated, coupled, related or connected. Scheduler 104 also contains information on the operating status of each functional unit, such as whether a given functional unit is currently executing an instruction or whether it is in an idle state and available to execute an instruction. Scheduler 104 receives instructions 102a–102g and determines which functional units are available to execute instructions 102a–102g. For example, as described above, instruction 102a may identify that accumulator one 108b is to be used. In accordance with a preferred embodiment of the present invention, accumulator one 108b is operatively associated with or coupled to MAC unit one 106b. Scheduler 104 will therefore send instruction 102a to MAC unit one 106b to be executed. MAC unit one 106b may obtain data operands from scalar register one 110b and scalar register two 110c and multiply these values to generate a result, total, product or the like. MAC unit one 106b then sends the product to accumulator one 108b. Accumulator one 108b adds the product to its existing stored value and stores the sum as its new value.

As exemplified with this illustration, instruction 102a need not specify what MAC unit should be used in execution. Scheduler 104 selects which MAC unit should be used based upon the existing coupling configuration among the MAC units and the accumulators and the accumulators identified in instruction 102a.

The following configuration illustrates a preferable relationship between MAC units and accumulators. If there are n MAC units, the MAC units are preferably numbered with consecutive integers from zero to n, where n is an integer. Accumulators that are operatively associated with or coupled with each MAC unit are numbered I, I+1*n, I+2*n, I+3*n, etc. where I is an integer in the set of 0 to n, i.e., I is a number of a given MAC unit. Any number of MAC units can be used in a given DSP and any number of accumulators can be coupled with a given MAC unit.

Figure 2:
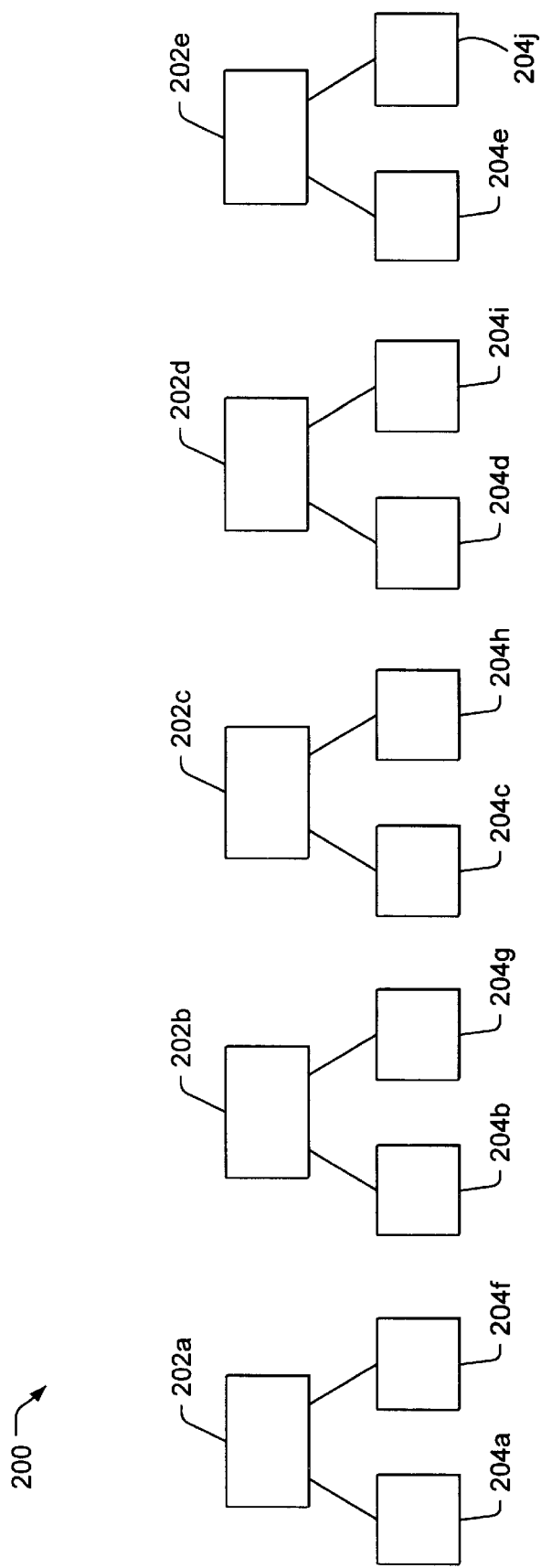
FIG. 2 shows a block diagram of an exemplary configuration between functional units.

Referring now to FIG. 2, in accordance with a preferred embodiment of the present invention, a preferred configuration 200 includes a plurality of first functional units 202a–202e, with each first functional unit 202a–202e unit being operatively associated or coupled with a plurality of second functional units 204a–204j. Exemplifying the above configuration, an exemplary processor has five first functional units 202a–202e numbered zero through four. (In the above example, n=5.) Each first functional unit 202a–202e is operatively associated with two second functional units 204a–204j as follows: first functional unit zero (I=0) 202a is operatively associated with second functional units zero (I) 204a and five (I+n) 204f, first functional unit one 202b is operatively associated with second functional units one 204b and six 204g, first functional unit two 202c is operatively associated with second functional units two 204c and seven 204h, first functional unit three 202d is operatively associated with second functional units three 204d and eight 204i, and first functional unit four 202e is operatively associated with second fictional units four 204e and nine 204j.

Again with reference to FIG. 2, in accordance with an alternate preferred embodiment of the present invention, first and second functional units may be any type of execution units or processing elements, such as MAC units and accumulators. Thus, a preferred configuration 200 includes a plurality of MAC units 202a–202e, with each MAC unit being operatively associated with a plurality of accumulators 204a–204j. Exemplifying the above configuration, a preferred configuration has five MAC units numbered zero through four. (In the above example, n=5.) Each MAC unit is coupled to two accumulators as follows: MAC unit zero (I=0) 202a is coupled to accumulators zero (I) 204a and five (I+n) 204f, MAC unit one 202b is coupled to accumulators one 204b and six 204g, MAC unit two 202c is coupled to accumulators two 204c and seven 204h, MAC unit three 202d is coupled to accumulators three 204d and eight 204i, and MAC unit four 202e is coupled to accumulators four 204e and nine 204j.

If an exemplary programming model operatively associates three accumulators for each MAC unit, again assuming five MAC units total (n=5), the numbering scheme would be as follows: MAC unit zero (I=0) 202a is operatively associated with accumulators zero (I) 204a, five (I+n) 204f and ten (I+2*n) (not shown), MAC unit one 202b is operatively associated with accumulators one 204b, six 204g and eleven (not shown), etc.

Dedicated multiple accumulators being operatively associated with each MAC unit permits data to be stored in an efficient and accessible manner. More specifically, with reference back to FIG. 1, assume a programmer desires to sequentially execute the following two instructions:

Instruction 1: MAC ACC0 SR1 SR2

Instruction 2: MAC ACC3 SR5 SR7

Both instructions utilize the same MAC unit, that is, MAC unit zero 106a. Because more than one accumulator is coupled to MAC unit zero 106a, the value in accumulator zero 108a can be stored in an easily accessible place after the execution of Instruction 1, while not preventing MAC unit zero 106a from executing additional instructions, such as Instruction 2, with the use of accumulator three 108d. If accumulator zero 108a was the only accumulator coupled to MAC unit zero 106a, the value in accumulator zero 108a would either have to be returned to memory, which consumes power and time, or replaced by the next instruction that requires the use of MAC unit zero 106a.

This configuration, which associates non-sequential accumulators to each MAC unit, is optimal for both vertical and horizontal parallelism. In the case of vertical parallelism, a group of consecutive MAC units may be treated as a vector unit. For example, referring to FIG. 2, MAC unit zero 202a and MAC unit one 202b could be combined to form VMAC 01 and could execute a vector MAC instruction. Assuming each MAC unit 202 is 32 bits×32 bits, VMAC 01 could execute a two-element vector operation (where each element is a 32-bit word) or a four-element vector operation (where each element is a 16-bit word). When consecutive MAC units are treated as a vector unit, the accumulators will automatically be grouped to form a vector accumulator based on the existing coupling configuration described above. Thus, accumulator zero 204a, accumulator one 204b, accumulator five 204f and accumulator six 204g may all be grouped together to execute the vector MAC operation. This grouping ensures the correct vector semantics for the vector operation.

In the case of horizontal parallelism, if a programmer uses consecutive accumulators, the configuration ensures that each instruction will be scheduled to different MAC units. This enables the instructions to be executed simultaneously because no two consecutive instructions will be waiting for a single MAC unit to complete the two instructions. For example, an instruction packet contains two instructions as follows:

MAC ACC1 SR1 SR2

MAC ACC2 SR3 SR4

The first instruction will be executed by MAC unit one 202b and the second instruction will be executed by MAC unit two 202c. This is because, although the specific MAC units are not identified in the instructions, in the configuration, accumulator one 204b is coupled to MAC unit one 202b and accumulator two 204c is coupled to MAC unit two 202c. Thus, both instructions can be executed simultaneously, without serialization, i.e., incurring a delay waiting for a MAC unit to complete a first execution, so that it may then complete a second execution.

In the event that one instruction packet contains two instructions utilizing non-sequential accumulators, where the accumulators are both coupled to the same MAC unit, serialization can occur. For example, an instruction packet contains two instructions as follows:

MAC ACC0 SR1 SR2

MAC ACC5 SR3 SR4

In this case, both instructions are sent from the scheduler to MAC unit zero 202a because accumulator zero 204a and accumulator five 204f are both coupled to MAC unit zero 202a. But, of course, both instructions cannot be executed simultaneously. Serialization in this case can be avoided by instructions or logic in the scheduler. When the scheduler identifies that two instructions require the same MAC unit, the scheduler could then generate an accumulator copy instruction which copies data from a specified accumulator into an accumulator that is coupled to a MAC unit that is currently idle or available to execute an instruction. The scheduler then sends the instruction to the idle or available MAC unit for execution.

It will be understood that the foregoing description is of preferred exemplary embodiments of this invention and that this invention is not so limited. Various modifications may be made in the design, arrangement, and implementation of this method and apparatus without departing from the spirit and scope of the subject invention, as set forth in the claims below.

What is claimed is:

1. A digital signal processor having a plurality of processing elements for use in executing a first instruction and a second instruction, said processor comprising:

a first multiplying element which executes a first instruction and multiplies at least two operands resulting in a product;

a first plurality of accumulating elements, each having an associated value and each being coupled to said first multiplying element;

a second multiplying element;

a second plurality of accumulating elements coupled to said second multiplying element;

a copying element which copies data from said different first accumulating element into one of said second plurality of accumulating elements; and an alteration element which forwards said second instruction to said second multiplying element for execution, wherein:

said first instruction uses one of said first plurality of accumulating elements and said second instruction uses a different one of said first plurality of accumulating elements.

2. A method of performing a MAC operation in a digital signal processor having a plurality of multiplying elements, each of which is coupled to a plurality of accumulating elements, comprising the steps of:

receiving an instruction in a scheduler, said instruction specifying a first of said plurality of accumulating elements;

identifying a first one of said plurality of multiplying elements that is coupled to said first accumulating element;

transmitting said instruction from said scheduler to said first multiplying element;

retrieving a plurality of operands located in a number of registers for use in said first multiplying element;

multiplying in said first multiplying element said plurality of operands resulting in a product;

adding said product to a stored value in said first accumulating element resulting in a total; and storing said total in said first accumulating element.

3. The method of claim 2, wherein a second of said plurality of multiplying elements is coupled to a second of said plurality of accumulating elements and wherein said instruction is a vector instruction, said method further comprising:

configuring said first multiplying element with said second multiplying element to operate in combination with one another in response to said instruction; and configuring said first accumulating element and said second accumulating element to operate in combination with one another in response to said instruction.

4. The method of claim 2, further comprising:

identifying said plurality of multiplying elements and said plurality of accumulating elements by a consecutive indexing scheme; and configuring said plurality of accumulating elements such that said consecutive accumulating elements are coupled to different elements selectable from said plurality of multiplying elements.

5. A digital signal processor comprising:

a plurality of first functional units which are operatively associated with a plurality of second functional units;

a number of register files having a plurality of data elements;

an instruction specifying one of said plurality of second functional units and at least one of said plurality of data elements; and a scheduler which receives said instruction and determines which one of said plurality of first functional units is operatively associated with said one second functional unit, wherein said one first functional unit receives said instruction, performs an operation on said at least one data element, and achieves a result.

6. The processor of claim 5, wherein said plurality of first functional units are multiplying elements and said plurality of second functional units are accumulating elements.

7. The processor of claim 5, wherein a second of said plurality of first functional units is operatively associated with a second of said plurality of second functional units, wherein said one first functional unit and said second first functional unit are configured to operate in combination with one another in response to said instruction, and wherein said one second functional unit and said second second functional unit are configured to operate in combination with one another in response to said instruction.

8. The processor of claim 7, wherein said plurality of first functional units are multiplying elements and said plurality of second functional units are accumulating elements.

9. The processor of claim 7, wherein said plurality of multiplying elements and said plurality of second functional units are identified by a consecutive indexing scheme such that said consecutive indexed second functional units are operatively associated with different units selectable from said plurality of first functional units.

10. The processor of claim 9, wherein said plurality of first function units are multiplying elements and said plurality of second functional units are accumulating elements.

* * * * *